US009442986B2

(12) United States Patent
Hong et al.

(10) Patent No.: US 9,442,986 B2
(45) Date of Patent: Sep. 13, 2016

(54) RANKING OF HETEROGENEOUS INFORMATION OBJECTS

(71) Applicant: INRIA—INSTITUT NATIONAL DE RECHERCHE EN INFORMATIQUE ET EN AUTOMATIQUE, Le Chesnay (FR)

(72) Inventors: Dohy Hong, Nozay (FR); Gérard Burnside, Nozay (FR); François Baccelli, Meudon (FR)

(73) Assignee: INRIA-INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 203 days.

(21) Appl. No.: 14/346,575

(22) PCT Filed: Sep. 18, 2012

(86) PCT No.: PCT/EP2012/068365
§ 371 (c)(1),
(2) Date: Mar. 21, 2014

(87) PCT Pub. No.: WO2013/041529
PCT Pub. Date: Mar. 28, 2013

(65) Prior Publication Data
US 2014/0229493 A1    Aug. 14, 2014

(30) Foreign Application Priority Data

Sep. 23, 2011   (EP) .................................... 11182453

(51) Int. Cl.
*G06F 17/30* (2006.01)

(52) U.S. Cl.
CPC ..... *G06F 17/3053* (2013.01); *G06F 17/30864* (2013.01); *G06F 17/30958* (2013.01)

(58) Field of Classification Search
USPC .......................... 707/709, 722, 723, 726, 748
See application file for complete search history.

(56) References Cited

U.S. PATENT DOCUMENTS

| 2005/0165780 | A1 | 7/2005 | Omega et al. |
| 2006/0112392 | A1 | 5/2006 | Zhang et al. |
| 2010/0114862 | A1* | 5/2010 | Young ............... G06F 17/30864 707/709 |

OTHER PUBLICATIONS

Ding Zhou et al. ("Co-ranking Authors and documents in a Heterogeneous Network", IEEE ICDM 2007).*

(Continued)

*Primary Examiner* — Hung T Vy
(74) *Attorney, Agent, or Firm* — Berenato & White, LLC

(57) ABSTRACT

A Computer implemented method of ranking information objects within a collection of information objects linked by a collection of links, the collection of information objects comprising information objects of a first nature and of a second nature, the links being associated to a link type selected among a plurality of link types, the method comprising: allocating a qualification weight to each link, selecting a plurality of paths comprising a sequence of information objects linked by a sequence of the links, for each information object, computing a score as a function of the respective contributions of the links that point to the information object, the contribution of a link being a function of the number of times the link has been selected in the path selection step and the qualification weight of the link, ranking the information objects as a function of the respective scores.

14 Claims, 4 Drawing Sheets

(56) References Cited

OTHER PUBLICATIONS

Ding Zhou et al: "Co-ranking Authors and Documents in a Heterogeneous Network", Data Mining, 2007. ICDM 2007. Seventh IEEE International Conference on, IEEE, Piscataway, NJ, USA, Oct. 28, 2007, pp. 739-744, XP031238331, ISBN: 978-0-7695-3018-5.

Sidiropoulos A et al: "Generalized comparison of graph-based ranking algorithms for publications and authors", Journal of Systems & Software, Elsevier North Holland, New York, NY, US, vol. 79, No. 12, Dec. 1, 2006, pp. 1679-1700, XP027900938, ISSN: 0164-1212 [retrieved on Dec. 1, 2006].

* cited by examiner

RANKING OF HETEROGENEOUS INFORMATION OBJECTS

CROSS-REFERENCE TO RELATED APPLICATIONS AND CLAIM TO PRIORITY

This application is a national stage application of International Application No. PCT/EP2012/068365 filed Sep. 18, 2012, which claims priority to European Patent Application No. 11182453.8 filed Sep. 23, 2011, of which the disclosures are incorporated herein by reference and to which priority is claimed.

FIELD OF THE INVENTION

The invention relates to the technical field of qualitative evaluation of information through structural analysis of links within heterogeneous collections of information objects, in particular it relates to methods for ranking information objects of all kinds.

BACKGROUND

Global Internet traffic shows a very important growing trend. Global IP traffic has increased eightfold over the past 5 years, will increase fourfold over the next 5 years and there will be more and more available contents and information in the Internet, more particularly with the rise of the social networks activities or with the rise of user generated and crowdsourced contents (such as video contents). In the context of search engines, it is important to be able to structure and rank the relevancy of each content in order to retrieve the right information relevant to each search request.

An existing approach to solve this problem is known as PageRank. PageRank, performs only object-level ranking on homogeneous information objects. The basic idea of PageRank consists of qualitatively ranking a homogeneous graph formed by pointers between web pages by iteratively taking into account the relevancy of a node which points to another node from the exploration of the graph.

Other solutions are quantitative ranking, such as based on number of views or the ratio of the number of Likes for Youtube video content, or local graph analysis such as H-index or number of citations for research publications. Those solutions are insufficient in terms of quality evaluation.

The document "Co-ranking Authors and Documents in a Heterogeneous Network" by Ding Zhou et al. Seventh IEEE International Conference on Data Mining (2007) describes a method for co-ranking authors and their publication using several networks: the social network connecting authors, the citation network connecting the publications as well as the authorship network that ties the authors and the publications together. The co-ranking is based on equations calculating a probability distribution on all the authors and publications. More precisely, this document describes an algorithm which distributes probabilities in a deterministic way and which uses arbitrary factors so as to specify predetermined profiles of paths.

US2006/112392 describes a system for ranking messages of discussion threads based on relationships between messages and authors. The ranking system defines an equation for attributes of a message and an author. The equations define the attribute values and are based on relationships between the attribute and the attributes associated with the same type of object, and different types of objects. The ranking system iteratively calculates the attribute values for the objects using the equations until the attribute values converge on a solution. The ranking system then ranks the messages based on attribute values.

US2005/0165780 describes a method of organizing electronic document-related information. The method includes a step of generating a collection of electronic documents, a step of forming from the collection, at least one cluster of documents based upon a user's selection of a subject, and a step of determining for each author of documents in the cluster, the number of times each the author is an author of a document corresponding to the subject. The authors are ranked and presented to the user in the form of an index. The ranked index can be interpreted as a ranking of subject matter experts.

The document "Generalized comparison of graph-based ranking algorithms for publications and authors" by A. Sidiropoulos et al., The Journal of systems & software 79 (2006) analyses algorithms used for Link Analysis Ranking. This document further describes a ranking method designed for citation graphs.

SUMMARY

In a context where the information objects are created by people, those existing solutions produce a non-qualitative ranking. By extracting one component of the graph, like an authors graph from a citation graph, existing solutions miss a major qualitative aspect.

In an embodiment, the invention provides a computer implemented method of ranking information objects within a collection of information objects stored in data repositories and linked by a collection of links, the links being oriented, the collection of information objects comprising
information objects of a first nature
and information objects of a second nature,
the links of said collection of links each being associated to a link type selected among a plurality of link types, the method comprising:
allocating a qualification weight to each link, the allocated weight being defined as a function of the link type associated to the link,
Selecting a plurality of paths within the collection of information objects, each path comprising a sequence of information objects linked by a corresponding sequence of the links, wherein each successive link of a path is selected randomly among the links that originate from a same information object using link selection probabilities, for each information object of the first nature, computing a score of the information object as a function of the respective contributions of the links that point to the information object, the contribution of a link being a function of the number of times the link has been selected in the path selection step and the qualification weight of the link,
ranking the information objects of the first nature as a function of the respective scores of the information objects of the first nature.

According to embodiments, such computer implemented method can comprise one or more of the features below.

In embodiments of the computer implemented method, the selecting of a path comprises a plurality of link selection steps for selecting the successive links.

In embodiments of the computer implemented method, a link selection step comprises a step of selecting a link type among the plurality of link types, and a step of selecting a link associated to the selected link type.

In embodiments of the computer implemented method, the selecting of a link is made randomly based on uniform probabilities.

There are several ways in which the selecting of a link within a path can be done. In embodiments of the computer implemented method, the selecting of a link is made randomly based on probabilities that are a function of the link previously selected at one or more link selection steps along the path. In embodiments of the computer implemented method, the selecting of a link is made as a function of a previously selected link along the path so as to obtain a predetermined sequence of links.

There are several ways in which the selecting of a link type within a path can be done. In embodiments of the computer implemented method, the step of selecting a link type is made randomly based on uniform probabilities. In embodiments of the computer implemented method, the step of selecting a link type is made randomly based on probabilities that are a function of the link previously selected at one or more link selection steps along the path. In embodiments of the computer implemented method, the step of selecting a link type is made as a function of a previously selected link type so as to obtain a predetermined sequence of link types.

In embodiments of the computer implemented method, the selecting of a path further comprises a step of terminating the path, the step of terminating the path being made randomly based on a damping factor. In embodiments of the computer implemented method, the damping factor is a determined value. In embodiments of the computer implemented method, the damping factor is a function of the link types of previously selected links of the path.

In embodiments of the computer implemented method, the qualification weight associated to a link is a value in the group of null or positive values.

In embodiments of the computer implemented method, the information objects are further linked by a second collection of links, the links of said second collection each being associated to a link type selected among a second plurality of link types, and wherein the method further comprises:
allocating a qualification weight to each link of the second collection of links, the allocation weight being defined as a function of the link type associated to the link,
Selecting a second plurality of paths within the collection of information objects, each path comprising a sequence of information objects linked by a corresponding sequence of the links, wherein each successive link of a path is selected randomly among the links that originate from a same information object using link selection probabilities,
for each information object of the first nature, computing the second score of the information object as a function of the respective contributions of the links of the second collection of links that point to the information object, the contribution of a link being a function of the number of times the link has been selected in the path selection step and the qualification weight of the link,
wherein the information objects of the first nature are ranked as a function of the first and second scores of the information objects of the first nature.

Such methods can be applied to information objects of many kinds. In embodiments of the computer implemented method, the information object natures are selected in the group consisting of personal profiles, user accounts, written publications, text contents, pictures, video contents, audio contents, circle of contacts, circle of interest and subject matter indicators.

In embodiments of the computer implemented method, the selection of the plurality of paths within the collection of information is made iteratively, the selecting of a path comprising:
(a) Selecting a first information object,
(b) Selecting a link among the links that originate from the selected information object using the link selection probabilities,
(c) Selecting the information object pointed to by the link,
(d) Increasing the score of the pointed information object as a function of the qualification weight of the link pointing the information object,
(e) with a probability value iterate to step (b) to continue the path or terminate the path.

In embodiments of the computer implemented method, the method further comprises
receiving a query from a user interface,
selecting an information object as a function of a content of the query,
wherein the selection of a plurality of paths comprises selecting one or more paths starting from the selected information object.

In embodiments of the computer implemented method, the selection of the first information object is made randomly.

In embodiments of the computer implemented method, the links comprise:
citation links, representing citation of a written publication by another written publication.
appreciative links, representing a vote by a person for an on-line content, such as like or recommendation.
depreciative links, representing a negative vote by a person for an on-line content, such as dislike.
Interest links representing the interest of a person for a concept,
keywords links representing the association of an information object to a concept,
subscription links representing the subscription of a person to a circle,
and/or any other links such as links representing the sharing of an information object in a community In embodiments, the method maybe applied to heterogeneous collections comprising objects of many different natures. The method is not limited to the ranking of objects of one nature. It may be implemented to rank objects of plural natures within the heterogeneous collections.

In corresponding embodiments of the computer implemented method, the method further comprises:
for each information object of the second nature, computing a score of the information object as a function of the respective contributions of the links that point to the information object, the contribution of a link being a function of the number of times the link has been selected in the path selection step and the qualification weight of the link,
ranking the information objects of the second nature as a function of the respective scores of the information objects of the second nature.

In embodiments, the invention also provides a computer program comprising computer-executable instructions that cause a computer to execute any one of the above mentioned methods.

Aspects of the invention are based on the idea of analyzing data that forms a heterogeneous graph, based on the objective information of the graph structure. By heterogeneous graph, we mean a graph implying the presence of information objects of different natures and of links of different types.

Aspects of the invention are based on the idea of providing ranking methods applicable to a very large context, from research citation graphs to the context of large crowdsourced contents such as crowdsourced large web contents.

An idea at the base of the invention consists in making a qualitative evaluation of an information object based not only on the presence of links having a qualitative significance that point directly to the information object, but also by taking into account the presence of the links having a qualitative significance that point to the origins of those links. Those origins include information objects of a different nature from the information object being evaluated and may be pointed to by links of a different type. The qualitative significance of a link can be explicit, e.g. as in links resulting from a vote by a person for an on-line content or implicit, e.g. as in links resulting from the co-authoring of a text by several persons.

Aspects of the invention are based on the idea of evaluating a score that represents an appreciation of an information object as viewed in a heterogeneous collection of information objects linked by a heterogeneous collection of links. Such appreciation score is evaluated not only as a function of explicit or implicit appreciations that have been given directly to the information object being evaluated, but also as a function of explicit or implicit appreciations that have been given to other information objects that are linked to the information object being evaluated. These other information objects include objects of a different nature from the information object being evaluated and may be pointed to by links of a different type from those links pointing directly to the information object being evaluated. Accordingly, a systematic approach is proposed to cause appreciations given on information objects of a given nature to have an impact on appreciation scores of information objects of a different nature.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 7:
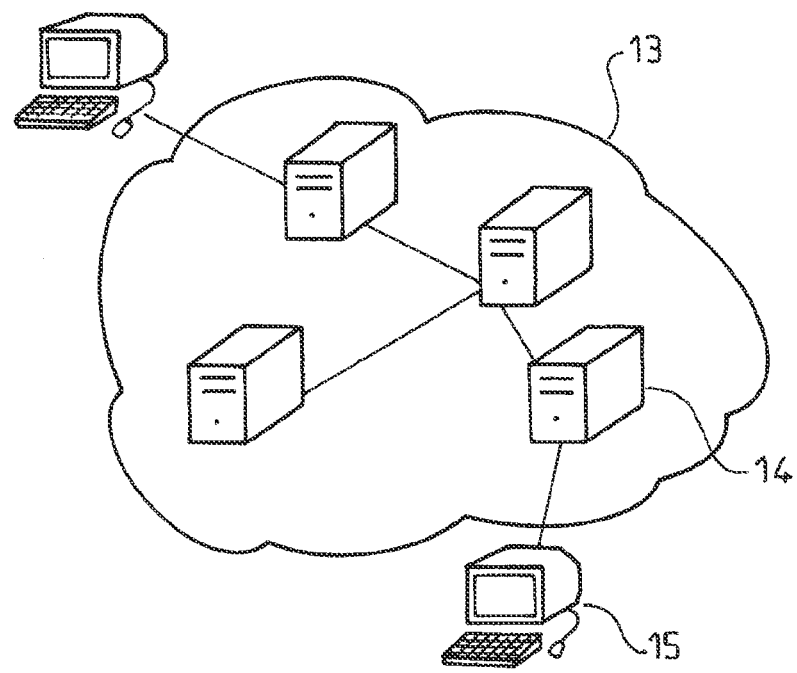
FIG. 7 is a schematic representation of a computer network in which embodiments of the invention can be implemented.

The FIG. 7 shows a network 13. Servers and databases 14 are interconnected through this network and create a distribution storage system for a large information collection. Through network stations 15, users have access to this data and can interact with, e.g. modify or create contents. The data stored on the network 13 comprise information objects which can be webpages, videos, pictures, personal profiles, urls, professional contents or user generated or crowdsourced contents and other data. Users interact with the stored data using applications such as search engines, web browsers and the like to perform operation such as retrieving, searching, sorting, filtering, ranking, ordering and/or downloading the information objects.

Figure 8:
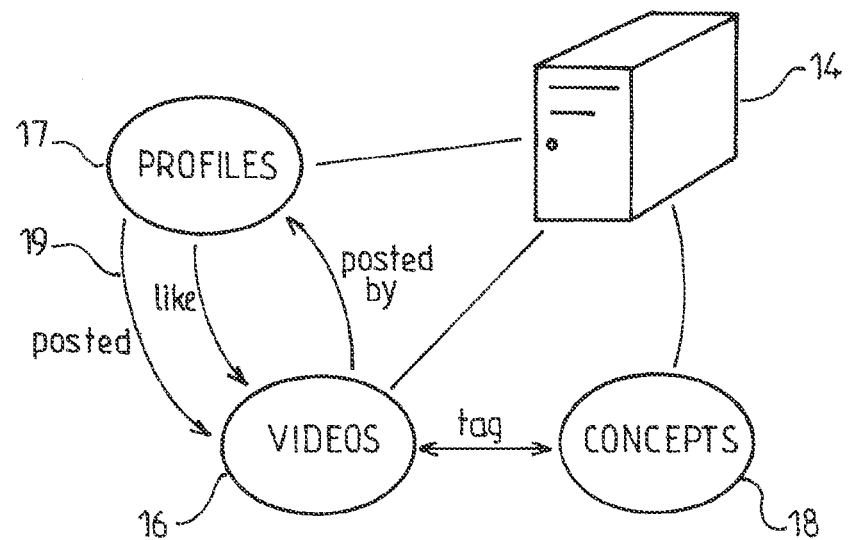
FIG. 8 is a schematic representation of crowdsourced content which can be ranked by the computer implemented method.

With reference to FIG. 8, there is shown a server 14 implementing an on-line service of video sharing. Those information objects stored in server 14 include videos 16, user profiles 17 and concepts indicators 18 which are linked by links of different natures such as tags, like, posted and posted by links. The on-line service is accessible via a webpage. A user profile information object is created when a user registers to the on-line service and can contain the name, password and personal information of the user. The video information objects are the movies users may watch on this on-line service. The concepts are collection of keywords related to a theme. They may be associated to videos under the form of a tag link. Those information objects are stored in databases on the server.

A user connected to the service using his profile can watch videos on the webpage of the on-line service. Furthermore, the user who likes the watched video can click on the "like" button situated on the webpage near the video. This action causes the server to store in a database information comprising the type of action the user made, in relation to the personal profile of the user and to the video on which the action was made. Such stored information embodies a like link between the user profile and the video.

Embodiments of the invention can compute score of those information objects taking into account all types of links stored in the server, as an example like links given by the appreciation made by the users through clicking on the like buttons, to qualitatively rank the videos or user profiles. This ranking can be done on a part of the information collection stored in the database.

Figure 1:
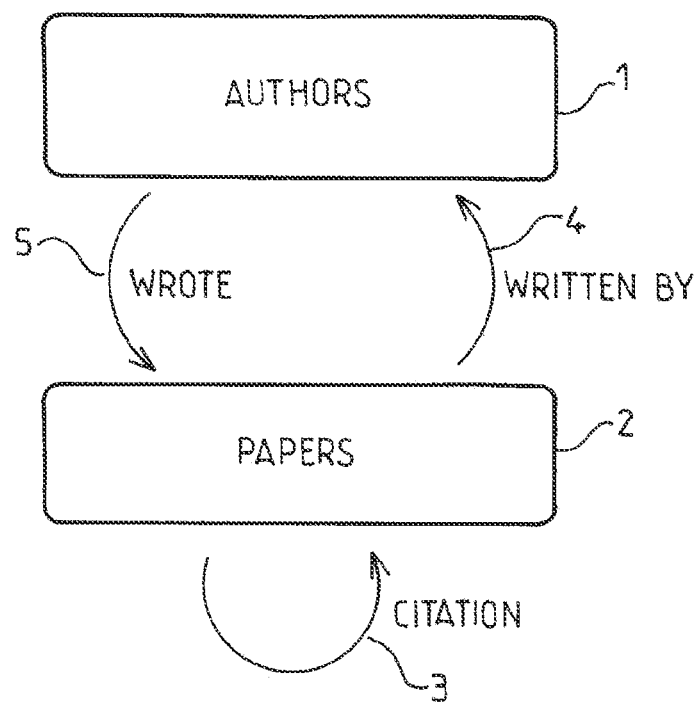
FIG. 1 is a schematic representation of a graph comprising authors, papers and citation links.
Figure 4:
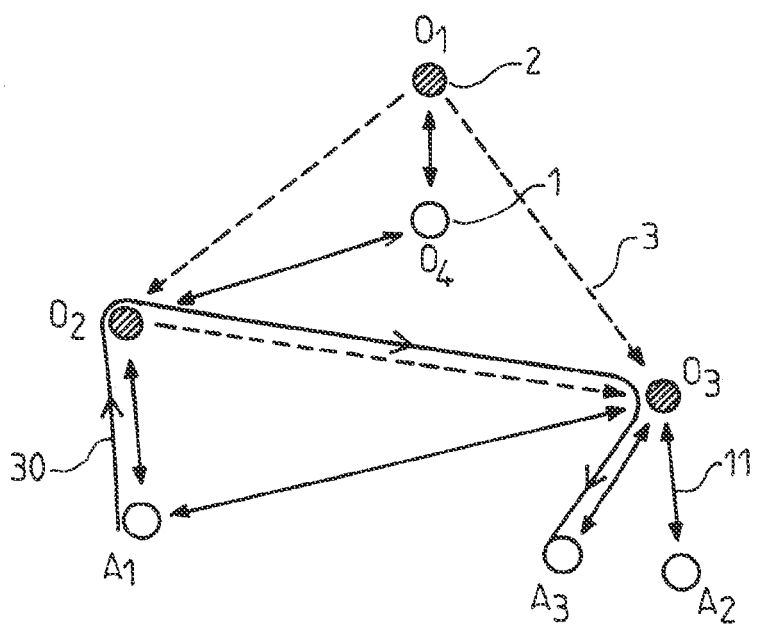
FIG. 4 is an example of a graph comprising authors, papers with their respective citation and creator/creature links.

With reference to FIGS. 1 and 4 a computer implemented method for ranking information object contained in a database will now be described. More specifically the method concerns the ranking of research papers 2 and authors 1 using the citation links.

Information objects stored in the database are from two natures, namely the papers 2 and the authors 1.

Those information objects are linked by links of three link types.

Numeral 3 are links that represent the fact that the first paper cites the second one and will be called citation links 3. Numeral 4 are links that represent the fact that the paper is written by the author and will be called written by links 4. Numeral 5 are links that represent the fact the author has written the paper and will be called wrote links 5. The links are oriented and have a qualification weight.

The citation link type 3 and the written by link type 4 are called positive links. The positive links have a qualification weight equal to one. The link type wrote 5 is neutral and therefore has a qualification weight which is null. However, in some embodiments the link type wrote is a positive link and has a qualification weight equal to one. In those embodiments, the contribution of highly scored authors is taken into account.

The method makes it possible to compute a score associated to each information object. The computation of the information object scores is made iteratively by the following steps:

Step 1: select an author Ai;

Step 2: Select a paper Oi written by author Ai with a probability inversely proportional to the number of co-authors: A paper with a lot of co-authors has a lower probability to be selected than a paper with a small amount of co-authors.

Step 3: Select a paper Oj cited by paper Oi with equiprobability among cited papers and increment the score of paper Oj by one, according to the qualification weight of the citation link 3;

Step 3b: with probability g restart Step 3, otherwise do Step 4. The probability value g is predetermined. If g is close to one, paths with a high number of papers will be preferred. If g is close to zero, paths alternating papers and authors, author-paper-author, will be preferred. The last selected paper Oj after zero or more iterations of Step 3 is called Ok;

Step 4: select an author Aj who wrote Ok with equiprobability among co-authors, increment the counter of Aj by one, accordingly to the qualification weight of the written by link 4;

Step 5: return to Step 1 with the damping probability e or to Step 2 with damping probability (1−e). The damping probability e is a predetermined value. The damping probability enables to avoid deadlock positions in the graph by re-initializing the path and/or to decrease exponentially the contribution of an information object distant from another information object.

In the above case a neutral link type is used in Step 2 and two positive link types are used for Step 3 and Step 4.

Therefore, the score of the first paper O1 is not incremented and the score of the author A2 and of the papers Oj are incremented.

After a high number of iterations, the ranking is made by sorting the scores of the information objects.

With reference to FIG. 4, a collection of information objects will now be described. The collections of information objects comprises papers 2 and authors 1. Citation links 3 are represented by dotted line arrow, the arrow pointing the paper which is cited. The doublesided arrows 11 represent the wrote links 5 and written by links 4 together.

FIG. 4 illustrates a possible path 30 resulting from the following steps: step 1: A1, step 2: O2, step 3: O3 and step 4: A3. Accordingly, O3 and A3 get their scores incremented by one.

If g=0, the above method yields the same ranking results as would be obtained by considering only the authors graph induced by citation links 3.

Figure 5:
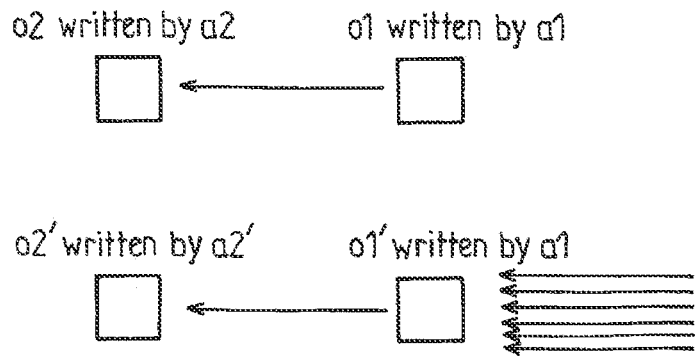
FIG. 5 is a schematic representation of two examples of information objects pointed by links.

The positivity of g plays an important role. This will be explained with reference to FIG. 5 that represents a very basic example of papers and authors information objects for which the scores are calculated.

A paper o1 is written by the author a1 and cites a paper o2 written by another author a2. No other paper cites paper o1 or paper o2. Another paper or is written by the first author a1 and yet another paper o2' is written by a third author a2'. Only paper or cites paper o2'. However, by contrast with paper o1, paper o1' is cited by a large amount of other papers.

If we consider only the Author-Paper-Paper-Author paths, o2 and o2' have the same contribution inherited from author a1, and therefore author a2 and author a2' have the same contribution as if author a2 and author a2' did not write any other paper. The contribution will be function of the contribution of a1 divided by the number of papers that author a1 wrote.

When g>0 the method takes into account the Author, Paper, . . . , Paper, Author paths for the calculation of the scores where 'Paper, . . . , Papers' denotes a certain number of steps along citation links 3 within the papers 2. Therefore, the large amount of citations of paper o2' by other papers is taken into account when computing the score of o2'. As a result, the paper o2' is better ranked than paper o2 and author a2' is better ranked than author a2.

In embodiments, all papers 2 where at least one author is a coauthor of paper O1 are excluded from paper O2 in the Step 3. This exclusion serves to avoid impacting the ranking scores with self-citations.

In an embodiment, the damping probability (e) is a function of previously selected links of the path.

In an embodiment (g) is set to 0.25, therefore the path will tend to be author, object, object, author. In another embodiment (g) is set to 0.75, the path will tend to go through a higher sequence of linked papers between two authors.

Figure 2:
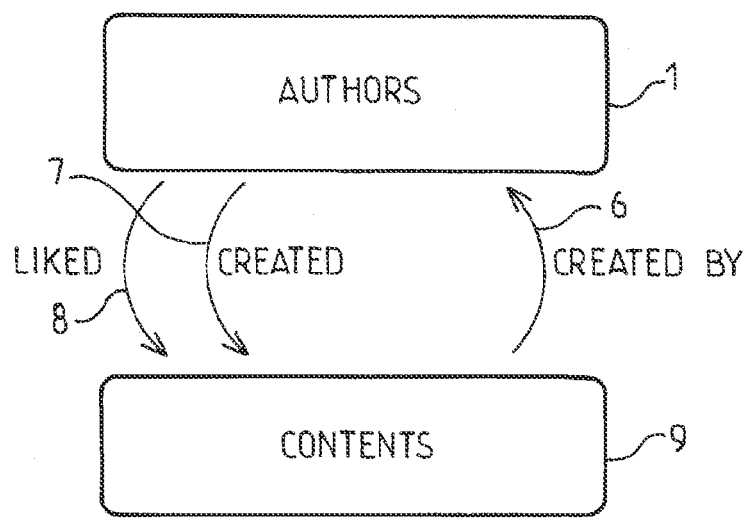
FIG. 2 is a schematic representation of a graph comprising authors, contents and like links.

With reference to FIG. 2, another example of a ranking method will now be described for the ranking of contents and authors 1 in a graph that comprises another type of link, namely the like links 8.

In FIG. 2 the information object natures are authors 1 Ai and contents 9.

Numeral 8 are links that represent the fact that the author likes the content and will be called like links 8. Numeral 6 are links that represent the fact that the content is created by the author and will be called created by links 6. Numeral 7 are links that represent the fact the author has created the content and will be called created links 7.

Like links 8 and created by links 6 are positive links with a qualification weight equal to one. Created links 7 are neutral links with a qualification weight equal to zero. However, in some embodiments the created link type is a positive link and has a qualification weight equal to one. In those embodiments, the contribution of highly scored authors is taken into account. The computation of the information objects scores is made iteratively by the following steps:

Step 1: Initialization: randomly select an author Ai;

Step 2: Among the list of liked objects of author Ai choose one object Ol using a uniform probability law. If no object receives a like link 8 from author Ai, return to Step 1;

Step 3: Among the list of creators of object Ol, select one author Aj using a uniform probability law;

Step 4: With probability (e) return to Step 1 or with probability (1−e) return to Step 2.

Again, the method makes it possible to compute scores of the authors to rank the authors 1 and/or scores of the contents 9 to rank the contents 9. In this example the path alternates systematically between authors and contents because no links are provided between objects of a same nature.

In another embodiment, the created links 7 are pruned from the graph of FIG. 2. There only remains like links 8 from person to object and created by links 6 from object to person. The algorithm is modeled by the following equations. The following notations are used: $l(Ai, Oj)$ denotes the like links 8. $c(Ai, Oj)$ denotes the created by links 6.

If an author Ai likes a content Oj then $l(Ai, Oj)=1$, otherwise $l(Ai, Oj)=0$. If a content Ok is created by an author Ai then c(Ai,Oj)=1, otherwise c(Ai,Oj)=0. The number of like links that an author A1 gives to works by another author A2 is then:

$$l(A1, A2) = \Sigma_{Oj \in O} c(A2, Oj) \times l(A1, Oj) \quad (1)$$

Then, the ranking score of authors is calculated by:

$$\text{rank}(A2) = \sum_{Ai \in A} \frac{l(Ai, A2)}{l(Ai)} \times \text{rank}(Ai) \quad (2)$$

Where l(Ai) is the normalization factor of the form $l(Ai) = \Sigma_{Ak \in A} l(Ai, Ak)$. From this person ranking, the ranking of contents is made by:

$$\text{rank}(Oj) = \sum_{Ai \in A} \frac{l(Ai, Oj)}{l(Ai)} \times \text{rank}(Ai) \quad (3)$$

Then, the ranking of a person can be obtained as the sum of the ranking scores of all objects created by this person:

$$\text{rank}(A1) = \Sigma_{Oj \in O} c(A1, Oj) \times \text{rank}(Oj) \quad (4)$$

In yet another embodiment, two link types can be selected in step 2: the like links 8 and the created links 7. The created link type is a positive link type and has a qualification weight equal to one. Therefore, a content created by an author who created another content which is very highly ranked could inherit importance from the shared author.

In yet another embodiment the like links 8 that originate from the creator of an object are excluded from the selection of step 2. This exclusion serves to avoid impacting the ranking scores with self-appreciations.

Figure 3:
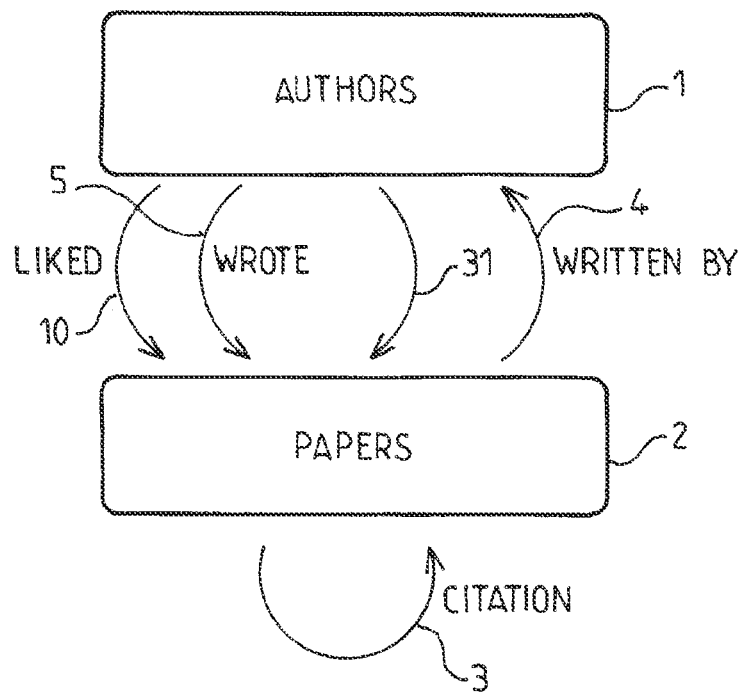
FIG. 3 is a schematic representation of a graph comprising authors, papers, citation links and appreciative links.

With reference to FIG. 3, another example of a ranking method will now be described for the ranking of research papers 2 and authors 1. Numeral 31 are links that represent the fact that the author dislikes the content and will be called dislike links 31. This ranking method uses the citation links 3 as well as the like links 10 and dislike links 31. A first part of the method for ranking authors 1 and papers 2 takes into account only the links of type like, citation, wrote and written by to compute a first score L of the information objects. The following computation is done:

Step 1: Initialization: randomly choose an author Ai;

Step 2: with fixed probability (a), select a paper Oj that is liked by author Ai using a uniform law, otherwise, among the list of publications of author Ai, select one paper Oj using a uniform law. If there is no paper, go to step 1;

Step 3: Among the list of cited references of paper Oj, choose one paper Ok using a uniform law. If there is no cited paper, return to step 1.

Step 4: With fixed probability (q), return to step 3, otherwise go to steps; The last selected paper after zero or more iterations of step 3 is called Ok;

Step 5: Among the co-authors of paper Ok, choose one author using a uniform law;

Step 6: With probability (e) return to step 1, otherwise return to step 2.

A second part of the method is executed similarly, whereas only the links of type dislike 31, citation 3, wrote 5 and written 4 are taken into account to compute a second score D of the authors and papers. For a given object, the first score L is a positive value representing how much the object is liked and cited. This first score takes into account both direct and indirect appreciations. The second score D is a positive value representing how much the object is disliked. It also takes into account direct and indirect appreciations. A combined score may be obtained by calculating the score aL−bD. a and b are positive weighting factors. However, in some embodiments, the citation link type is neutral during the second part and therefore has a qualification weight which is null. Therefore, the contribution of a paper which is disliked to another paper is not taken into account. Moreover, in those embodiments, the second score D takes into account only the direct appreciations.

In another embodiment, a similar two-part method takes into account only the paths with like links 10 in the first part and only the paths with citation links 3 in the second part. A combined score is calculated e.g. as the sum of the two scores, namely L(like)+L(citation).

In an embodiment, the papers authored by neighbor authors may be excluded. For instance, in step 3, papers written by one of the coauthors of the paper selected in step 2 may be excluded.

Figure 6:
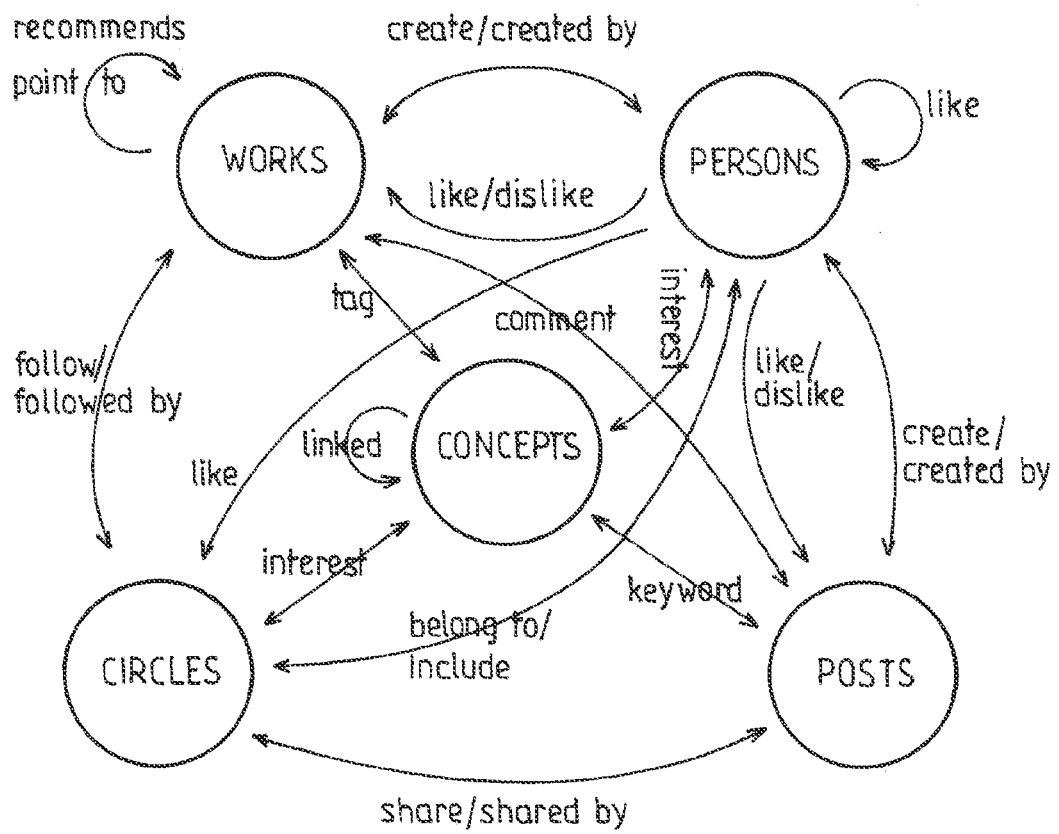
FIG. 6 is a schematic representation of a graph with 5 natures of objects and their links.

With reference to FIG. 6, there will be described another embodiment of a method of ranking information objects of five natures: Works (O), Persons (A), Concepts (T), Circles (C), Posts (M). Those natures of objects comprise:

Works: video contents, pictures, text contents, etc.;
Persons: authors/creators of the Works;
Concepts: explicit or implicit keywords associated to any object, such as tags associated to Works;
Circles: mailing list or shared space defined by access rights among a list of Persons;
Posts: messages associated to Works or Persons.

Those information objects can be linked through different types of links Examples of those links are:

Work Oi created by Person Aj;
Person Ai likes Work Oj;
Person Ai dislikes Work Oj;
Person Ai and Aj are co-creators of a Work Ok;
Person Ai and Aj belong to the same Circle Ck;
Person Ai posted a message Mj about the work Ok: this leads to two link types: a created by link between person Ai and message Mj, and a comment link between message Mj and work Ok;

While it is believed that the five natures mentioned in FIG. 6 are useful in order to have the full qualitative evaluation and avoid missing relevant information, the method described above can be applied to heterogeneous collections comprising any number of different object natures. The most important object nature is the Person. Indeed, due to the fact that a person may have a long history, a high number of links may be originating from or pointing to that person.

The method of ranking information objects may be generalized for the ranking of N sets of information objects.

Each pair of information objects in N can be connected by an oriented link based on a link type in R={R(j, i), i, j= 1 . . . K}, where R(j, i) is the link type of a link from an information object of type i to an information object of type j. In a general configuration, all possible link types between any pair of information objects can exist.

Some examples of link types are:

from a person A1 to another A2, such as a recommendation or liking;
from a group of persons Gp1 to another group Gp2;
from a person A1 to a work O1, such as A1 likes or dislikes O1;
from a work O1 to another work O2, such as O1 cites O2;

from a work O1 to a person A1, such as O1 is created by A1;

from a person A1 to a work O1, such as A1 has created O1;

from a work O1 to a concept T1, such as O1 is tagged with keyword T1;

from a person A1 to another person A2, such as A1 and A2 are in a same circle C1;

from a post M1 to a work O1, such as a message M1 is posted/attached as comment to a video content O1;

Each link type Ri can be given three different meanings:

a positive relation such as like, citation, recommendation link types. In that case, the link is given a relatively high selection probability and/or qualification weight, depending on the a priori significance of the relationship a negative relation such as dislike a neutral relation for example: created. In that case the link is given a low or null selection probability and/or qualification weight.

A practical algorithm based on the idea of random walk on the graph is used. Such an algorithm is convergent to a unique solution, because of its contraction property.

An embodiment of the algorithm is:

Step 1: The initialization step is to select one information object. In certain embodiments several information objects are selected. The selection is made randomly.

Step 2: Select one link type Ri with a probability Pi and select a next information object. The selection is made by uniform probabilities on all possible next information objects among the information objects linked to the selected information object with a link of the selected link type. A step is made from one information object to another information object of the same nature or a different nature. The fact that we choose with positive probability each possible transition including staying on the same nature of information object or changing allows to obtain a score that reflects and aggregates different types of appreciations given on objects of different natures.

Step 3: With probability (1−e) return to Step 2 and with probability (e) return to Step 1. (e) is the damping factor.

In an embodiment, it may be desirable to control the probability that a path includes an homogeneous section, i.e. a section of the path that consists of a sequence of information objects of the same nature linked by links of the same type, and the average length of such a homogeneous section. For that purpose, it is possible to use a probability coefficient similar to the above-mentioned probability g that serves to control links of type 'citation'. A similar probability coefficient can be used for each link type. As an example, the method comprises a probability coefficient g1 for the links of type 'citation' between information objects of the 'paper' nature and a probability coefficient g2 for the links of type 'like' between information objects of the 'authors' nature. Such probability coefficients control the probability that several consecutive hops of the path follow links of the same type to form an homogeneous path section. When the next information object is reached through a link of a neutral link type, the counter of the destination is not incremented, whereas when reached through a positive or negative one, it is incremented by one.

The ranking is obtained by counting the number of times an information object is selected after a large number of iterations of Step 1 to Step 3. Then by dividing the total number of times the information objects were selected, a weight of each information object is obtained. A normalization is done per nature of information objects.

Iterations are applied for positive and neutral link types and negative and neutral link type separately, respectively giving a ranking Ai and a ranking Bi. The global ranking may be obtained by calculating aAi−bBi on each information object. a and b are numbers between 0 and 1.

The ranking is obtained by sorting according to their score with higher values corresponding to best ranked information objects. Generally, the ranking is only relevant to compare information objects of a same nature. Whereas it is possible to compute ranking scores for objects of any nature, the respective scores are not applicable to compare objects of different natures. This is because objects of different natures are intrinsically not comparable. E.g. an author cannot be said to be better or less appreciated than a movie.

In embodiments, parameters are set in order to have a determined sequence of link types Ri in Step 2.

In some embodiments, we may choose a deterministic sequence of link types or impose a given order of transitions between the information object natures in Step 2.

In embodiments the algorithm takes into account the time aspect of the events by analyzing object creation date, date of the link type creation.

In embodiments the algorithm takes into account the content such as meta-data, keywords to differentiate the weight of the link.

The above described methods for ranking can be implemented in various data collections, such as those produced in social networks or video sharing networks for the ranking of information objects such as videos or personal profiles or in search engines for the sorting of retrieved webpages. The ranking scores can serve to facilitate or enhance data-related functions such as retrieving, searching, sorting, filtering, ranking, ordering and/or downloading information objects.

As an example, a search engine may perform the method of ranking on retrieved webpages associated to keywords. A user types a query in a search engine. The query contains a keyword. The search engine retrieves the information objects matching the keywords, sorts them according to their previously computed ranks and displays the best ranked information objects. As a result, the user will have access to the relevant information objects of the collection associated to his query. The filtering of objects through the use of keywords can be combined with the ranking methods in various manners, i.e. the filtering can be done before or after the ranks are computed.

In another embodiment, a user types a query. A collection of information objects is filtered as function of the keywords. The search engine computes the ranks of information objects of the filtered collection using the above described methods and selects and displays the best ranked information objects of one or more natures on a user interface.

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

In the claims, any reference signs placed between parentheses shall not be construed as limiting the scope of the claims.

The invention claimed is:

1. A computer implemented method of ranking information objects within a collection of information objects stored in data repositories and linked by a collection of links, the links being oriented, the collection of information objects comprising information objects of a first nature and information objects of a second nature,
the links of said collection of links each being associated to a link type selected among a plurality of link types, the method comprising a step of ranking the information objects of the first nature as a function of the respective scores of the information objects of the first nature,
wherein the method comprises:
allocating a qualification weight to each link, the allocated weight being defined as a function of the link type associated to the link,
selecting a plurality of paths within the collection of information objects, each path comprising a sequence of information objects linked by a corresponding sequence of the links, wherein each successive link of a path is selected randomly among the links that originate from a same information object using link selection probabilities, and wherein the selecting of a path further comprises a step of randomly deciding to either continue the path with a probability value equal to (1−e), where e denotes a damping factor or to terminate the path with a probability value equal to the damping factor,
for each information object of the first nature, computing a score of the information object as a function of the respective contributions of the links that point to the information object, the contribution of a link being a function of the number of times the link has been selected in the path selection step and the qualification weight of the link.

2. A computer implemented method according to claim 1, in which the selecting of a path comprises a plurality of link selection steps for selecting the successive links.

3. A computer implemented method according to claim 2, in which a link selection step comprises a step of selecting a link type among the plurality of link types, and a step of selecting a link associated to the selected link type.

4. A computer implemented method according to claim 3, in which the step of selecting a link type is made randomly based on uniform probabilities.

5. A computer implemented method according to claim 3, in which the step of selecting a link type is made randomly based on probabilities that are a function of the link previously selected at one or more link selection steps along the path.

6. A computer implemented method according to claim 3, in which the step of selecting a link type is made as a function of a previously selected link type so as to obtain a predetermined sequence of link types.

7. A computer implemented method according to claim 1, in which the damping factor is a function of previously selected links of the path.

8. A computer implemented method according to claim 1, wherein the information objects are further linked by a second collection of links, the links of said second collection each being associated to a link type selected among a second plurality of link types, and wherein the method further comprises:
allocating a qualification weight to each link of the second collection of links, the allocation weight being defined as a function of the link type associated to the link,
selecting a second plurality of paths within the collection of information objects, each path comprising a sequence of information objects linked by a corresponding sequence of the links, wherein each successive link of a path is selected randomly among the links that originate from a same information object using link selection probabilities,
for each information object of the first nature, computing the second score of the information object as a function of the respective contributions of the links of the second collection of links that point to the information object, the contribution of a link being a function of the number of times the link has been selected in the path selection step and the qualification weight of the link,
wherein the information objects of the first nature are ranked as a function of the first and second scores of the information objects of the first nature.

9. A computer implemented method according to claim 1, wherein the information object natures are selected in the group consisting of personal profiles, user accounts, written publications, text contents, pictures, video contents, audio contents, circles of contacts, circles of interest and subject matter indicators.

10. A computer implemented method according to claim 1, wherein the selection of the plurality of paths within the collection of information is made iteratively, the selecting of a path comprising:
(a) Selecting a first information object,
(b) Selecting a link among the links that originate from the selected information object using the link selection probabilities,
(c) Selecting the information object pointed to by the link,
(d) Increasing the score of the pointed information object as a function of the qualification weight of the link pointing the information object,
(e) with a probability value iterate to step (b) to continue the path or terminate the path.

11. A computer implemented method according to claim 1, wherein the method further comprises:
receiving a query from a user interface,
selecting an information object as a function of a content of the query,
wherein the selecting of a plurality of paths comprises selecting one or more paths starting from the selected information object.

12. A computer implemented method according to claim 1, wherein the links comprise appreciative links, representing a vote by a person for an on-line content.

13. A computer implemented method according to claim 1, wherein the method further comprises:
  for each information object of the second nature, computing a score of the information object as a function of the respective contributions of the links that point to the information object, the contribution of a link being a function of the number of times the link has been selected in the path selection step and the qualification weight of the link,
  ranking the information objects of the second nature as a function of the respective scores of the information objects of the second nature.

14. A non-transient computer readable medium comprising program instructions that cause a computer to execute the method according to claim 1.

\* \* \* \* \*